United States Patent

Karafian

[15] 3,668,250

[45] June 6, 1972

[54] UREA SYNTHESIS PROCESS

[72] Inventor: Maxim Karafian, Cold Spring Harbor, N.Y.

[73] Assignee: Chemical Construction Corporation, New York, N.Y.

[22] Filed: Aug. 19, 1969

[21] Appl. No.: 851,327

[52] U.S. Cl. ........................260/555 A, 23/193, 260/534 R
[51] Int. Cl. ..........................................C07c 127/04
[58] Field of Search ..................260/555 A, 534 R

[56] References Cited

UNITED STATES PATENTS

| 3,317,601 | 5/1967 | Otsuka et al. | 260/555 A |
| 3,506,710 | 4/1970 | Inoue et al. | 260/555 A |
| 3,248,425 | 4/1966 | Ledergerber | 260/555 A |
| 3,172,911 | 3/1965 | Mavrovic | 260/555 A |

Primary Examiner—Leon Zitver
Assistant Examiner—Michael W. Glynn
Attorney—J. L. Chaboty

[57] ABSTRACT

Aqueous urea solution formed by synthesis from ammonia and carbon dioxide is heated for water vapor evaporation and concentration by indirect heat exchange with a reacting mixture of off-gas and aqueous absorbent solution, which generates heat due to re-absorption of off-gas components in the aqueous absorbent solution.

13 Claims, 1 Drawing Figure

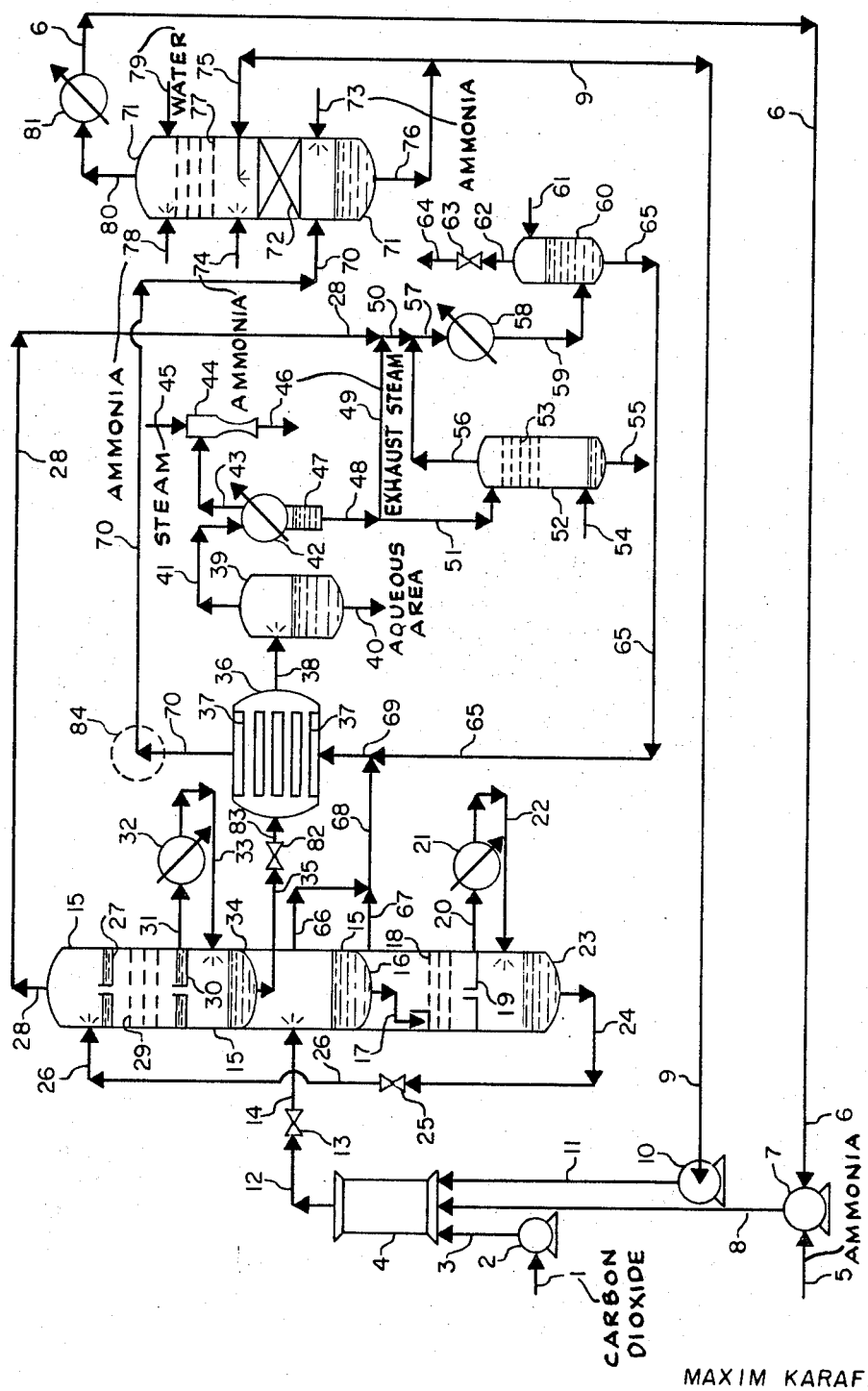
MAXIM KARAFIAN
INVENTOR.
BY [signature]
AGENT

UREA SYNTHESIS PROCESS

BACKGROUND OF THE INVENTION

1. Field of the Invention

The invention relates to the synthesis of urea from ammonia and carbon dioxide at elevated temperature and pressure, in processes in which an off-gas containing ammonia and carbon dioxide is generated by heating the synthesis effluent stream at reduced pressure.

2. Description of the Prior Art

Heat exchange improvements between component streams in urea synthesis are described in U.S. Pat. Nos. 3,366,682; 3,258,486; 3147,304 and 3,137,725. Improvements in complete recycle urea synthesis processes are described in U.S. Pat. Nos. 3,172,911; 3,191,916; 3,155,722; 3,155,723 and U.S. patent application No. 521,921 filed Jan. 20, 1966 and issued as U.S. Pat. No. 3,527,799 on Sept. 8, 1970.

SUMMARY OF THE INVENTION

In the present invention, the off-gas generated from the urea synthesis effluent stream by heating at reduced pressure is mixed for reabsorption and reabsorbed in an aqueous absorbent solution prior to recycle in a combination recycle urea synthesis process, by a process which efficiently uses the heat generated by off-gas absorption to heat the product aqueous urea solution and thereby evaporate water, by indirect heat exchange of the respective streams. The off-gas reabsorption in an aqueous absorbent solution serves to liberate a large proportion of heat, which is thus effectively employed by indirect heat exchange to heat the product aqueous urea solution, in order to evolve water vapor and produce a more concentrated product solution or melt.

The principal advantage of the present invention is that the heat liberated by reabsorption of off-gas in an aqueous absorbent solution is utilized in a more effective manner. Another advantage is that aqueous urea solution produced by the urea synthesis process is concentrated in a more efficient manner, with a substantial saving of steam previously employed for this purpose. A more economical complete recycle urea synthesis process is thereby provided.

It is an object of the present invention to provide an improved urea synthesis process.

Another object is to provide a urea synthesis process with a reduced requirement of heating steam.

A further object is to provide a more efficient and economical urea synthesis process.

An additional object is to more efficiently concentrate the aqueous urea solution produced by a urea synthesis process which generates a mixed off-gas stream.

Still another object is to reabsorb the mixed off-gas of a urea synthesis process in an aqueous absorbent solution in a more efficient manner, by indirect heat exchange with product aqueous urea solution, to thereby evolve water vapor and concentrate the product urea solution.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented.

Carbon dioxide feed stream 1 is compressed in the compressor 2 to elevated pressure and passed via stream 3 into urea synthesis autoclave 4. Makeup ammonia stream 5 and recycle liquid ammonia stream 6 are compressed in pump 7 to elevated pressure, and the resulting combined ammonia feed stream 8 is passed into autoclave 4. A recycle aqueous ammoniacal ammonium carbamate stream 9 is compressed or pressurized by pump 10, and the resulting high pressure aqueous ammonium carbamate solution stream 11 is also passed into autoclave 4. Urea synthesis reaction conditions are maintained in unit 4 to promote ammonium carbamate formation and dehydration to yield urea. These urea synthesis conditions in unit 4 generally consist of an elevated pressure typically in the range of 150 to 300 kg./sq.cm., an elevated temperature generally in the range of 150° to 250 ° C, and an overall ammonia to carbon dioxide molar ratio typically in the range of 2.5:1 to about 6:1. Under these conditions and in the presence of excess ammonia, all of the feed carbon dioxide is converted to ammonium carbamate and a major portion of the total ammonium carbamate present in autoclave 4 is dehydrated to urea. The resulting urea synthesis effluent stream 12 discharged from unit 4 contains urea, unconverted ammonium carbamate, excess ammonia and water.

Stream 12 is passed through pressure reducing valve 13, and the resulting process stream 14, now at a reduced pressure typically in the range of 10 to 30 kg./sq.cm., is passed into the middle section of stripping column 15, in which ammonium carbamate is decomposed and stripped from the liquid phase. An off-gas component stream rich in ammonia is spontaneously evolved and separated from the residual liquid phase in the middle section of unit 15, and the liquid phase, now at a reduced temperature generally in the range of 100° to 150° C., collects above the partition or baffle 16 within unit 15. The liquid phase, now principally containing urea, ammonium carbamate and water, is passed via stream 17 onto the stripping trays 18, and the liquid stream 17 flows downwards across and through the trays 18 countercurrent to a rising hot gaseous phase which decomposes ammonium carbamate and strips the resultant ammonia and carbon dioxide from the liquid phase.

The downflowing liquid discharged from trays 18, now of diminished ammonium carbamate content, is recovered on retention plate 19 which collects the downflowing liquid while permitting upwards gas or vapor flow. The liquid is removed from above plate 19 via stream 20, which is heated in heat exchange unit 21 by indirect heat exchange with steam or other suitable hot fluid to attain further ammonium carbamate decomposition. The resultant heated stream 22, now at a temperature generally in the range of 140° to 200° C., and containing an evolved gaseous phase consisting of ammonia, carbon dioxide and water vapor, is passed into the bottom portion of unit 15 above partition 23. The hot gaseous portion of stream 22 separates from the liquid phase in the bottom of unit 15, and the hot gaseous phase rises through plate 19 and trays 18, thus serving as a stripping medium for stripping ammonium carbamate from the liquid on trays 18.

The liquid phase collected above the bottom partition 23 of unit 15 is removed via stream 24, which is passed through pressure reducing valve 25. The resulting process stream 26, now at a reduced pressure typically in the range of 2 to 10 kg./sq.cm. and a reduced temperature generally in the range of 90° to 130° C., and containing an evolved gaseous phase, is passed into the upper end of unit 15 above liquid distributing plate 27. The evolved gaseous phase component of stream 26, together with stripped off-gas produce as will appear infra, is removed from the top of unit 15 via stream 28, which is processed for recycle of components as will appear infra.

The liquid phase flows downwards from plate 27 through and across trays 29, which are similar in configuration and function to the trays 18 described supra. A rising hot gaseous phase flows upwards through trays 29 and decomposes and strips ammonium carbamate from the downflowing liquid phase. The resulting liquid phase of depleted ammonium carbamate content collects on liquid retention plate 30, and the liquid on plate 30 consists essentially of an aqueous urea solution containing only a minor residual proportion of ammonium carbamate and free ammonia. Plate 30 is similar in configuration and function to plate 19 described supra, and plate 30 collects downflowing liquid while permitting upwards gaseous flow. The collected liquid phase is removed from plate 30 via stream 31, which is heated in heat exchanger 32 by indirect heat exchange with steam or other hot fluid, to decompose residual ammonium carbamate. The resulting hot process stream 33, now at an elevated temperature typically in the range of 110° to 150° C. and containing an evolved gaseous phase, is passed into unit 15 below plate 30. The evolved gaseous phase of stream 33 rises through plate 30 and trays 29, and strips ammonium carbamate from the liquid phase. The resultant off-gas passes above plate 27 and is removed via stream 28.

The residual liquid component of stream 33 collects in unit 15 above partition 34 and is removed via stream 35, which consists essentially of an aqueous urea solution containing a minor residual proportion of ammonia and carbon dioxide, and which is now processed in accordance with the present invention. Stream 35 is passed through pressure reducing valve 82, and the resultant stream 83 of reduced pressure and temperature is passed into heat exchange concentrator 36 and is heated in the tubes 37 of unit 36 in accordance with the present invention, with concomitant evaporation of water and evolution of a gaseous phase principally consisting of water, together with minor proportions of ammonia and carbon dioxide. The resultant mixed vapor-liquid stream 38 discharged from the tubes 37 of unit 36 is passed into vapor-liquid separator 39, from which the product concentrated aqueous liquid urea solution or melt is removed via stream 40 and passed to suitable finishing operations such as further evaporative concentration and crystallization or prilling.

A vacuum effect is maintained in unit 39, with a reduced internal pressure generally in the range of 0.2 to 0.8 kg./sq.cm. within unit 39, by withdrawing stream 41 under vacuum. Stream 41 generally consists mostly of water vapor, together with minor proportions of ammonia and carbon dioxide, and stream 41 is passed into flash gas condenser 42 which is maintained at a reduced temperature generally in the range of 30° to 60° C. by indirect heat exchange with cooling water, brine, or the like. A vacuum effect is maintained in unit 42 via stream 43, which passes to flash gas ejector 44, through which high pressure steam stream 45 is passed to provide a venturi stream jet effect, with discharge stream 46 passing to atmosphere.

Returning to unit 42, a condensed vapor receiver 47 is provided for recovery of liquid condensate from unit 42. The liquid condensate, consisting of a very dilute aqueous solution containing ammonia values, is removed from unit 47 via stream 48, and a portion of stream 48 is preferably passed via stream 49 to combine with stream 28 and form the mixed gas-liquid stream 50. The balance of stream 48 passes via stream 51 to the ammonia recovery stripper 52, in which the liquid flows downwards across and through the plates or trays 53, countercurrent to a rising stripping steam stream 54 which is passed into unit 52 below trays 53. The rising steam strips ammonia and carbon dioxide from the liquid phase, and a stripped liquid water phase is removed from the bottom of unit 52 via stream 55, which may be discharged to waste, generally after indirect heat exchange with stream 51, not shown. The stripped ammonia, carbon dioxide and steam vapors are removed from the top of unit 52 via stream 56, which is combined with stream 50 to form stream 57. The stream 57 is a combined aqueous vapor-liquid stream containing substantial proportions of ammonia and carbon dioxide derived from stream 28, and stream 57 is now processed to form the aqueous absorbent solution utilized in accordance with the present invention.

Stream 57 is now passed into cooler-condenser 58, and the process stream is cooled and condensed to liquid in unit 58 by indirect heat exchange with cooling water or the like. The resultant liquid stream 59, now containing only a minor proportion of gaseous components such as inerts, is passed into separator 60, in which the non-condensable components rise countercurrent to a wash water stream 61. Inerts or the like, now substantially free of ammonia values, are removed from the top of unit 60 via stream 62, which is vented to atmosphere via vent valve 63 as stream 64. The liquid phase in unit 60 is withdrawn via stream 65, which is employed as an aqueous absorbent solution in accordance with the present invention.

Stream 65 is now combined and reacted with off-gas streams derived from the process, which results in absorption of ammonia and carbon dioxide into the liquid phase, formation of ammonium carbamate, and the generation of large amounts of heat, due to absorption of the gaseous phase into the liquid phase. The off-gas streams are derived from unit 15, with off-gas stream 66 being withdrawn from the middle section of unit 15 as the off-gas component evolved on the reduction of the pressure of stream 14. Off-gas stream 67 is removed from unit 15 below partition 16, and stream 67 is derived from ammonium carbamate decomposition and off-gas evolution in stripping section 18. Streams 66 and 67 are preferably combined to form stream 68, which is now combined with stream 65 to form a hot reacting gas-liquid mixture stream 69, which is passed into the shell of unit 36 external to the tubes 37 and serves to heat stream 83 as described supra. Stream 69 is thereby cooled in unit 36, and the resultant cooled stream 70 discharged from the shell of unit 36 is now processed to produce a concentrated aqueous ammonium carbamate solution for recycle to urea synthesis.

Stream 70 is now passed into suitable means for condensation and formation of an aqueous ammonium carbamate solution. In this preferred embodiment of the invention, stream 70 is passed into a condenser-stripper in which substantially pure gaseous ammonia as well as aqueous ammoniacal ammonium carbamate solution are prepared for recycle. Stream 70 thus passes into condenser-stripper unit 71 below the packed gas-liquid contact section 72. Liquid ammonia stream 73 is sprayed into unit 71 below section 72 and vaporizes to provide a cooling effect and also to induce carbon dioxide condensation as ammonium carbamate. Similarly, liquid ammonia stream 74 is sprayed into unit 71 above section 72. A recycle aqueous ammonium carbamate solution stream 75 is sprayed into bed 72 and flows downwards countercurrent to the rising gaseous phase, and scrubs carbon dioxide from the gas phase into the liquid phase as condensed ammonium carbamate. The resulting concentrated aqueous ammoniacal ammonium carbamate solution collects in the bottom of unit 71, and is removed via stream 76, with a portion of stream 76 being directly derived as the liquid phase of stream 70. Stream 76 is divided into recycle stream 75 and stream 9, which is recycled to urea synthesis as described supra.

The rising gaseous phase in unit 71 above bed 72 now flows upwards through gas reflux section 77, which is provided with a plurality of trays or bubble cap plates or the like for gas reflux and cooling, to condense substantially all of the carbon dioxide from the gas phase. Liquid ammonia stream 78 is flashed or vaporized into unit 71 above trays 77, and provides a cooling effect as well as final carbon dioxide condensation to the liquid phase, which is formed on the upper trays by injecting a small amount of water into unit 71 via stream 79 above trays 77. The resultant purified ammonia vapor is removed from the top of unit 71 above section 77 via stream 80, which is now condensed to liquid ammonia in the cooler-condenser 81 and recycled to urea synthesis via stream 6 as described supra.

Numerous alternatives within the scope of the present invention will occur to those skilled in the art, besides those alternatives mentioned supra. The ranges of process variables such as pressure and temperature enumerated supra constitute preferred embodiments for optimum utilization of the process concepts of the invention, and the process may be practiced outside of these ranges in suitable instances. Stream 66 is preferably produced by substantially adiabatic expansion of stream 12 through valve 13, and in many instances stream 66 will consist mostly of ammonia vapor. In such cases, stream 66 may alternatively be passed directly into unit 71 together with streams 70 and 73, preferably after preliminary cooling. In this case, stream 68 would be derived solely from stream 67. In some instances, it may be advantageous to include a small proportion of urea in stream 65, such as by adding the mother liquor from a urea crystallizer to stream 65, in order to promote ammonium carbamate solubility in the system. All of stream 48 may be processed via stream 51 in some cases, with stream 49 being omitted and stream 57 being derived solely from streams 28 and 56. Vent gases from the ammonia storage vessels may be added to streams 56 and/or 41. Stream 70 may be optionally additionally passed through optional crystallizer heat exchange unit 84, for further cooling by indirect heat exchange with crystallizer mother liquor or crystal slurry or the like, prior to passing stream 70 into unit 71.

An example of an industrial application of the process of the present invention will now be described.

EXAMPLE

The invention was applied to the design of 200 tons per day urea production facility. Following are operating conditions and component flow rates for principal process streams.

| Stream Number | Temp., °C. | Pressure, kg./sq. cm. | Component flow rate, kg./hr. | | | | |
|---|---|---|---|---|---|---|---|
| | | | Ammonia | Carbon dioxide | Water | Urea | Inerts |
| 5 | 37 | 19.3 | 4,350 | | 9 | | |
| 1 | 42 | 1.2 | | 5,595 | 193 | | 22 |
| 79 | 37 | 19.7 | | | 226 | | |
| 61 | 37 | 3.5 | | | 111 | | |
| 9 | 87 | 21.8 | 4,740 | 3,250 | 2,710 | | |
| 8 | 69 | 230 | 8,230 | | | | |
| 3' | 66 | 230 | | | 9 | | |
| 12 | 192 | 230 | | 5,595 | | | 22 |
| 66 | 120 | 22.2 | 8,673 | 3,270 | 5,100 | 7,580 | 22 |
| 24 | 160 | 22.2 | 3,855 | 555 | 186 | | 22 |
| 67 | 126 | 22.2 | 1,390 | 321 | 4,730 | 7,580 | |
| 35 | 131 | 3.9 | 3,425 | 2,390 | 177 | | |
| 28 | 108 | 3.9 | 178 | 57 | 4,250 | 7,580 | |
| 40 | 96 | 3.2 | 1,210 | 264 | 478 | | |
| 41 | 96 | 0.5 | 40 | 20 | 2,340 | 7,580 | |
| 48 | 45 | 0.4 | 138 | 37 | 1,910 | | |
| 49 | 45 | 3.9 | 164 | 37 | 1,910 | | |
| 51 | 91 | 3.9 | 129 | 29 | 1,508 | | |
| 54 | 140 | 3.9 | 35 | 8 | 406 | | |
| 56 | 110 | 3.9 | | | 109 | | |
| 55 | 96 | 3.9 | 35 | 8 | 29 | | |
| 65 | 40 | 3.5 | 1,618 | 300 | 485 | | |
| (*) | 37 | 19.7 | 8,180 | | 2,120 | | |
| 80 | 47 | 19.7 | 12,360 | | | | 22 |

* Combined total of streams 73, 74 and 78.

I claim:

1. A process for the synthesis of urea from ammonia and carbon dioxide which comprises
   a. reacting ammonia, carbon dioxide and recycled aqueous ammonium carbamate solution at elevated temperature and pressure, to synthesize urea and form a synthesis effluent stream containing urea, ammonium carbamate, excess ammonia and water,
   b. heating said synthesis effluent stream at reduced pressure to decompose ammonium carbamate and generate a first off-gas containing ammonia, carbon dioxide and water vapor,
   c. separating said first off-gas from the residual liquid phase,
   d. heating said residual liquid phase to generate a second off-gas containing ammonia, carbon dioxide and water vapor and to form an aqueous urea solution substantially free of ammonium carbamate and ammonia,
   e. absorbing at least a portion of said first off-gas in an aqueous absorbent solution to form ammonium carbamate in solution and generate heat while in indirect heat exchange with said aqueous urea solution, whereby water vapor is evaporated from said aqueous urea solution,
   f. passing the resultant aqueous absorbent solution and residual off-gas below a gas-liquid contact zone, whereby said residual off-gas rises through said zone,
   g. injecting liquid ammonia above and below said zone, whereby said liquid ammonia vaporizes and carbon dioxide is condensed to ammonium carbamate within said zone,
   h. withdrawing aqueous ammoniacal ammonium carbamate solution below said zone,
   i. recycling a portion of the withdrawn aqueous solution above said zone, whereby said solution scrubs the rising off-gas phase in said zone,
   j. passing the balance of said withdrawn aqueous solution to urea synthesis as said recycled aqueous ammonium carbamate solution,
   k. further cooling and refluxing the rising gaseous phase from said zone in a gas reflux zone into which liquid ammonia and water are injected,
   l. recovering substantially pure ammonia vapor above said gas reflux zone, and
   m. recovering urea from said aqueous urea solution of step (e).

2. The process of claim 1, in which said synthesis effluent stream is heated at reduced pressure by passing said synthesis effluent stream downwards through a heating zone and countercurrent to a rising hot gaseous phase, and heating the resulting liquid effluent phase of reduced ammonium carbamate content to generate said hot gaseous phase.

3. The process of claim 2, in which said resulting liquid effluent phase is heated to generate said hot gaseous phase by withdrawing said resulting liquid effluent phase from the bottom of said heating zone, heating said withdrawn liquid phase external to said heating zone, separating the resulting hot gaseous phase from the residual liquid phase, and passing the resulting hot gaseous phase upwards through said heating zone.

4. The process of claim 1, in which said aqueous absorbent solution is an aqueous solution containing dissolved ammonia and carbon dioxide.

5. The process of claim 1, in which said aqueous absorbent solution comprises an aqueous urea solution.

6. The process of claim 1, in which said aqueous absorbent solution is formed by at least partially condensing said second off-gas of step (d) to form an aqueous liquid condensate, and recycling at least a portion of said aqueous liquid condensate as said aqueous absorbent solution.

7. A process for the synthesis of urea from ammonia and carbon dioxide which comprises
   a. reacting ammonia, carbon dioxide and recycled aqueous ammonium carbamate solution at elevated temperature and pressure, to synthesize urea and form a synthesis effluent stream containing urea, ammonium carbamate, excess ammonia and water,
   b. reducing the pressure of said synthesis effluent stream, whereby a first off-gas is generated,
   c. separating said first off-gas from the residual synthesis effluent stream,
   d. heating said residual synthesis effluent stream to decompose ammonium carbamate and generate a second off-gas, said second off-gas containing ammonia, carbon dioxide and water vapor, e. separating said second off-gas from the residual liquid phase, f. heating said residual liquid phase to generate a third off-gas containing ammonia, carbon dioxide and water vapor and to form an aqueous urea solution substantially free of ammonium carbamate and ammonia, g. absorbing at least a portion of said first off-gas and said second off-gas in an aqueous absorbent solution to form ammonium carbamate in solution and generate heat while in indirect heat exchange with said aqueous urea solution, whereby water vapor is evaporated from said aqueous urea solution, h. passing the resultant aqueous absorbent solution and residual off-gas below a gas-liquid contact zone, whereby said residual off-gas rises through said zone, i. injecting liquid ammonia above and below said zone, whereby said liquid ammonia vaporizes and carbon dioxide is condensed to ammonium carbamate within said zone, j. withdrawing aqueous ammoniacal ammonium carbamate solution below said zone, k. recycling a portion of the withdrawn aqueous solution above said zone, whereby said solution scrubs the rising off-gas phase in said zone, l. passing the balance of said withdrawn aqueous solution to urea synthesis as said recycled aqueous ammonium carbamate solution, m. further cooling and refluxing the rising gaseous phase from said zone in a gas reflux zone into which liquid ammonia and water are injected, n. recovering substantially pure ammonia vapor above said gas reflux zone, and o. recovering urea from said aqueous urea solution of stop (g).

8. The process of claim 7, in which the pressure of said synthesis effluent stream is reduced according to step (b) under substantially adiabatic conditions.

9. The process of claim 7, in which said residual synthesis effluent stream is heated at reduced pressure in step (d) by passing said residual synthesis effluent stream downwards through a heating zone and countercurrent to a rising hot gaseous phase, and heating the resulting liquid effluent phase of reduced ammonium carbamate content to generate said hot gaseous phase.

10. The process of claim 9, in which said resulting liquid effluent phase is heated to generate said hot gaseous phase by withdrawing said resulting liquid effluent phase from the bottom of said heating zone, heating said withdrawn liquid phase external to said heating zone, separating the resulting hot gaseous phase from the residual liquid phase, and passing the resulting hot gaseous phase upwards through said heating zone.

11. The process of claim 7, in which said aqueous absorbent solution is an aqueous solution containing dissolved ammonia and carbon dioxide.

12. The process of claim 7, in which said aqueous absorbent solution comprises an aqueous urea solution.

13. The process of claim 7, in which said aqueous absorbent solution is formed by at least partially condensing said third off-gas of step (f) to form an aqueous liquid condensate, and recycling at least a portion of said aqueous liquid condensate as said aqueous absorbent solution.

* * * * *